United States Patent
Garrison et al.

[11] Patent Number: 5,924,015
[45] Date of Patent: Jul. 13, 1999

[54] POWER CONTROL METHOD AND APPARATUS FOR SATELLITE BASED TELECOMMUNICATIONS SYSTEM

[76] Inventors: Arthur L. Garrison, 2522A Nelson Ave., Redondo Beach, Calif. 90278; Terrence R. Smigla, 303½ Bayview Dr.; Scott A. Stephens, 1900 Oak, both of Manhattan Beach, Calif. 90266

[21] Appl. No.: 08/640,198

[22] Filed: Apr. 30, 1996

[51] Int. Cl.⁶ .................................................. H04B 7/185
[52] U.S. Cl. .......................... 455/13.4; 455/522; 455/427
[58] Field of Search .................................. 455/12.1, 13.1, 455/13.4, 450, 453, 504, 522, 427, 430, 69, 67.1, 67.3; 342/353, 354

[56] References Cited

U.S. PATENT DOCUMENTS

| | | | |
|---|---|---|---|
| 4,228,538 | 10/1980 | Scharla-Nielsen et al. | 455/13.4 |
| 4,261,054 | 4/1981 | Scharla-Nielsen | 455/13.4 |
| 4,309,764 | 1/1982 | Acampora | 370/83 |
| 4,752,967 | 6/1988 | Bustamante et al. | 455/13.4 |
| 5,446,756 | 8/1995 | Mallinkrodt | 455/427 |
| 5,574,984 | 11/1996 | Reed et al. | 455/522 |
| 5,625,868 | 4/1997 | Jan et al. | 455/13.4 |

*Primary Examiner*—Reinhard J. Eisenzopf
*Assistant Examiner*—Marsha D. Banks-Harold
*Attorney, Agent, or Firm*—Michael S. Yatsko

[57] ABSTRACT

A power control method and apparatus are provided for a satellite based telecommunications system. The system includes a power control subsystem which is operative with systems operations center for distributing available satellite power between earth stations. Each earth station includes a baseband manager which subdivides the available satellite power between subband beams emitted from the satellite. The earth station further includes beam processors which manage the power allocated to each subband within an associated beam in order to maintain a desired signal quality in a forward link between the satellite and user terminals within the associated subbands. The beam processors communicate with modems, each of which is assigned to a particular user terminal. Each modem controls the satellites transmission power in the forward link to the user terminals to maintain a desired signal-to-noise ratio at the user terminal receiver. The signal-to-noise ratio is determined by the corresponding beam processor. The subsystem further provides a dynamic power control loop between user terminals in the forward and return links to maintain a desired signal quality. The subsystem automatically controls the satellite output power level to ensure proper power emission by a satellite in connection with feeder links from multiple earth stations.

12 Claims, 13 Drawing Sheets

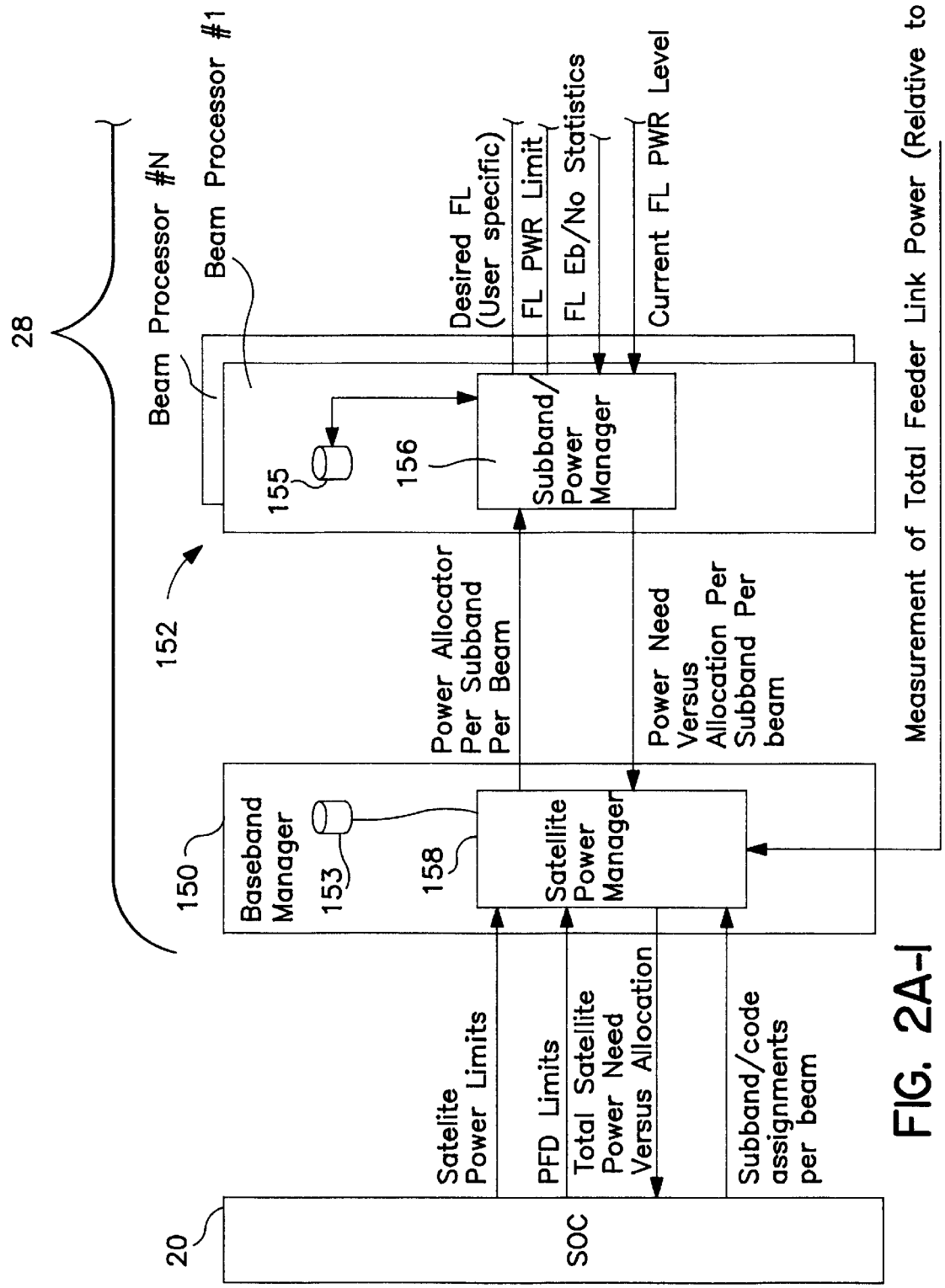
FIG. 2A-I

POWER CONTROL METHOD AND APPARATUS FOR SATELLITE BASED TELECOMMUNICATIONS SYSTEM

FIELD OF THE INVENTION

The present invention generally relates to satellite based telecommunications. More specifically, the invention relates to a power control subsystem for optimizing satellite power usage while maintaining a desired quality of service with user terminals.

BACKGROUND OF THE INVENTION

Satellite based telecommunications systems have been proposed to provide cellular communications links between user terminals (mobile and fixed) and earth stations. The earth stations, in turn, connect the user terminals with remote originating/destination callers through public land mobile networks (PLMN), public switching telephone networks, other earth stations and satellites, and the like. Each user terminal communicates with an assigned earth station along corresponding forward and return links which are supported by a satellite which has the user terminal and earth station in its field of view.

Each satellite includes at least one antenna which defines its earth coverage region or footprint. The satellite antenna(s) divide the coverage region into multiple beam spots. Each beam spot is assigned at least one frequency subband along which communications signals travel in the forward and return directions between user terminals and earth stations. Each subband may support communications from a plurality of user terminals. The user terminals are assigned unique transmission channels or "circuits" within an associated subband. A channel or "circuit" represents a unique path along which the corresponding user terminal transmits and receives RF signals containing discrete frames or packets of communications data and/or command information. A channel or circuit may be defined in a variety of ways, depending upon the system's coding technique such as time division multiple access (TDMA), frequency division multiple access (FDMA) code division multiple access (CDMA), or any combination thereof.

The transmitters in each earth station, satellite and user terminal emit an RF signal with sufficient power to ensure that the intended receiver receives the RF signal with a desired quality of service. The quality of service of a communications link is dependent on the signal-to-noise ratio (SNR) of the RF signal. Different types of user terminals (portable, fixed, special, geographically specific, etc.) have associated minimum SNR levels required to afford a desired quality of service. Thus, each satellite must transmit RF signals in associated subbands at varying power levels to maintain the desired quality of service which depend upon the intended user terminal type.

In addition, satellites vary the RF signal transmission power levels between subbands and between channels in a subband to account for system factors, such as the position of the beam spot for an associated subband, the number of user terminals assigned to the subband, the position of the user terminals within the associated beam spot, the amount of interference between the user terminal and satellite (rain, fog, clouds, etc.), the distance to the user terminal and the like. The above-noted system factors continuously change, and thus the satellite must continuously update the transmission power level of RF signals in each subband to each user terminal.

However, each satellite is afforded a limited supply of power. Each satellite has many power demands upon this limited supply. Thus, it is desirable to maximize the transmission efficiency. To do so, satellite antennas have been implemented with nonlinear amplifiers which drive the antenna array to transmit the RF signals. However, driving the nonlinear amplifiers too far into saturation will cause excessive intermodulation distortion as well as reduced amplifier reliability.

A need remains for a satellite system which optimizes the satellite transmitter operating power level, while maintaining a desired quality of service at each user terminal.

Moreover, proposed satellite systems have been unable to satisfactorily control the "effective isotropic radiated power" (EIRP) emitted by an earth station and received by a corresponding satellite. As noted above, an earth station passes RF signals to a desired user terminal along a forward link of a communication channel. In the forward link, the associated satellite receives each RF signal via a feeder link with the earth station. The satellite then retransmits this received RF signal in the subband of the beam spot containing the destination user terminal. The satellite must transmit the RF signal at a power level sufficient to provide the desired signal-to-noise ratio (SNR) and quality of service at the user terminal. A need remains for a satellite system which affords control at the earth station of the power output of the satellite for each channel.

Each satellite may receive RF signals along multiple feeder links from multiple earth stations. Each earth station is located a different distance from the satellite and at a different point within the satellite field of view. Consequently, RF signals from different earth stations may be received at different power levels. Power fluctuations in the received RF signal may further vary due to signal interference, such as clouds, rain and the like. Hence, RF signals from an earth station covered by clouds would be weaker than an RF signal from an earth station with no cloud cover. A need remains for an improved feeder link between the earth stations and satellites.

The present invention provides an improved power control satellite subsystem which overcomes the disadvantages discussed above and experienced in the past.

OBJECTS OF THE INVENTION

It is an object of the present invention to provide a power control subsystem for a satellite based telecommunications system which optimally allocates power among earth stations with respect to corresponding coverage satellites.

It is a further object of the present invention to ensure that the earth stations, satellites and user terminals operate within federally mandated power flux density limits (PFD limits).

It is a further object of the present invention to provide an adjustable quality of service within forward and return communications links between earth stations and user terminals.

It is a corollary object of the present invention to enable the quality of service to be adjusted based on satellite loading, user position within the satellite's field of view, the forward link signal-to-noise ratio and terminal type.

It is yet a further object of the present invention to ensure that the power control subsystem maintains optimal control when satellite power usage approaches maximum power limits.

It is yet a further object of the present invention to initiate handover operations between beams and/or satellites to optimize satellite power load management.

It is another object of the present invention to provide an aggregate power control subsystem which distributes satellite RF signal power resources between multiple earth stations in such a way that the amplifiers driving the satellite-to-user transmitters are operated at a desired point within a nonlinear operating range to avoid signal distortion.

It is a further object of the present invention to provide a two-way user-level dynamic power control system which adjusts power transmitted to and from an individual user terminal to maintain a desired signal quality at the user terminal and at the earth station.

Another object of the present invention is to provide automatic level control of the earth station transmission power (EIRP) and receive feeder link power at the satellite.

DETAILED DESCRIPTION OF THE PREFERRED EMBODIMENTS

Figure 1:
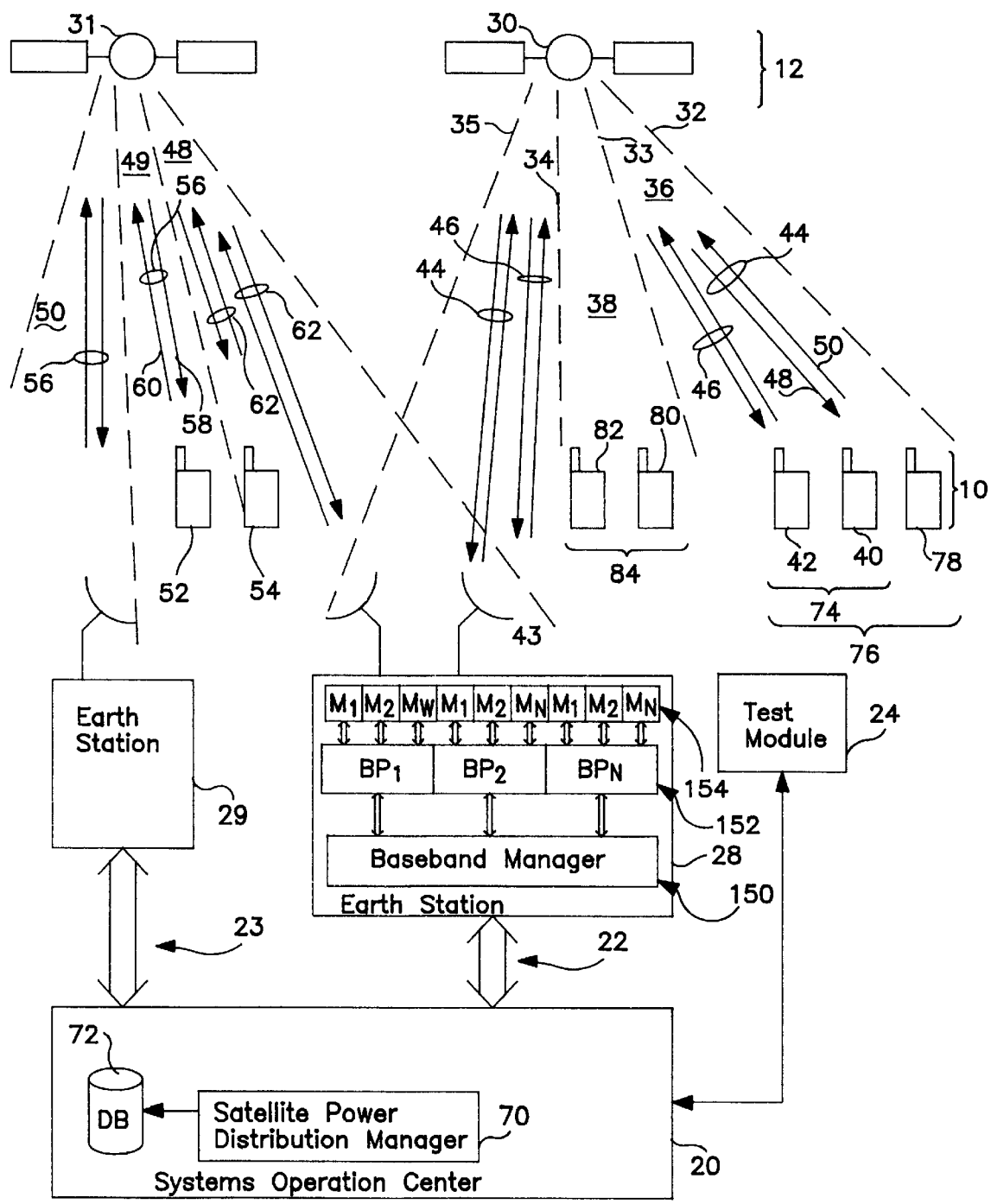
FIG. 1 illustrates a block diagram of a satellite based telecommunications system according to the preferred embodiment of the present invention.

FIG. 1 generally illustrates a satellite based telecommunications system representative of a preferred embodiment. The system includes a plurality of user terminals 10 which communicate with corresponding earth stations 16 via coverage satellites 12. Each user terminal communicates with its assigned earth station via a unique communications channel. A channel includes a forward link from the earth station to the user terminal and a return link from the user terminal to the earth station. Each forward and return link is further divided into an earth station-to-satellite section and a user terminal-to-satellite section. Each channel carries RF signals within a preassigned subband having a central carrier frequency. Each satellite divides its coverage area (e.g., field of view) into multiple beam spots. Each beam spot may support one or more subbands. Thus, the carrier frequency of a particular channel is dependent upon the beam spot covering the user terminal. FIG. 1 illustrates an exemplary implementation of this communications architecture.

As illustrated in FIG. 1, satellite 30 divides its coverage area into three beam spots, the boundaries of which are defined by dashed lines 32–35. Beam spot 36 covers a first group of user terminals, while beam spot 38 covers a second group of user terminals. Terminals 40 and 42 communicate along channels 44 and 46, respectively, with earth station 28. Channel 44 includes a forward link 48 and a return link 50. The satellite 30 relays RF signals along channels 44 and 46 to the earth station 28.

Satellite 31 similarly includes multiple beam spots 48 and 50 which support communications between earth station 29 and user terminal 52. User terminal 52 communicates along channel 56 which includes a forward link 58 and a return link 60. As shown by channel 62, earth station 28 may also communicate with user terminals (i.e., terminal 54) which are covered by satellite 31. Earth station 28 communicates with user terminal 54 via channel 62.

The earth stations 28 and 29 communicate with a system operations center (SOC) 20 through communication lines 22 and 23. The SOC 20 includes a satellite power distribution manager 70 which distributes power among the satellites 30 and 31 as explained below.

The earth station 28 includes a baseband manager 150 which communicates with SOC 20 and manages power output of the satellite 30 within subbands assigned to the earth station 28. The baseband manager 150 communicates with a plurality of beam processors 152. Each beam processor is associated with a unique beam emitted by the satellite 30. Thus, unique beam processors manage communications within corresponding beams 36 and 38. Each beam processor 152 reallocates power between channels within the corresponding beam as explained below. Each beam processor 152 communicates with a plurality of modems 154. Each modem 154 is uniquely associated with a channel and operates to maintain a desired quality of service (i.e., signal-to-noise ratio) for an associated user terminal. The outputs of the modems 154 are combined and transmitted via antenna 43 to the satellite 30 as composite RF signals.

The user terminals 10 may be of differing types, such as portable terminals, cellular terminals, fixed/stationary terminals, special terminals, geographically specific terminals and the like.

It is understood that only a subset 74 of the user terminals may be actively communicating at any given time. The system allocates a number of "radio resources" to each earth station. Radio resources represent the number of channels and/or subbands assigned to an earth station. Thus, while a group of channels or radio resources 76 may be assigned to an earth station, only the subset 74 of these terminals will be using radio resources to actively communicate.

By way of example, the system may register the user terminals in set 76 with earth station 28 since these terminals are located in a predefined fixed geographic zone of coverage assigned to the earth station. Optionally, this registration may be stored on a visitor location register stored at an earth station, at the SOC, or at a separate module which communicates with the earth stations. Alternatively, the system may calculate, through past system demands, a number of user terminals which historically have attempted to establish communications links with the earth station 28 at a given time of day. Based on these calculations, the SOC 20 informs the earth station 28 of a predicted number of channels to be needed as group 76 associated with beam spot 36. Optionally, in a CDMA or TDMA coded system, the SOC 20 may provide a number of codes usable by the earth station for each subband. The SOC further informs the earth station 28 of the number of user terminals expected to be in group 84 which will communicate along subbands corresponding to beam spot 38.

The user terminals 10 may be of differing types, such as portable terminals, cellular terminals, fixed/stationary terminals, special terminals, geographically specific terminals and the like. It is understood that only a subset 74 of the user terminals may be actively communicating at any given time. Thus, while a group 76 of user terminals 10 may be assigned to earth station 28, only a subset 74 of these terminals will be actively engaged in communications at any given time.

Satellite 30 emits RF signals along each forward transmission link in channels 44 and 46 at a power demand level determined by the earth station 28 (as explained below).

Each subband may support multiple communications channels based on any of several communication techniques, such as TDMA, FDMA, CDMA, and any combination thereof. The transmission power levels of all channels within a subband are combined to determine the power demand at the satellite for the associated subband. Each earth station is assigned to individual beam spots and operates to control the power demand for each subband within the beam spot. By way of example, a satellite 30 may cooperate with a single earth station 28 and thus, the earth station 28 controls the power demand of every beam spot for the satellite. However, when multiple earth stations 28 and 32 operate with a single satellite 31, each earth station is assigned to a subset of the beam spots for the satellite 31. For instance, earth station 28 may be assigned all user terminals in beam spot 48, while earth station 29 may be assigned all user terminals in the remaining beam spots 49 and 50. Accordingly, earth station 28 will control the power emitted by the satellite 31 within beam spot 48, while earth station 29 would control the power emitted by the satellite within the remaining beam spots.

The systems operation center (SOC) 20 is responsible for distributing the power available for use by each satellite. The systems operation center (SOC) 20 includes a satellite power distribution manager 70. The satellite power distribution manager 70 determines the total transmission power capacity of each satellite and divides the satellite's available power among the multiple earth stations communicating with the satellite. The satellite's total available power and distribution per earth station may be determined in a variety of manners, such as from preassigned values for each satellite stored in a data base 72. Optionally, the power distribution manager 70 may empirically calculate the power distribution between earth stations for a satellite based on historical use data evidencing past demands of the satellite over a desired period of time. As a further alternative, the power distribution manager 34 may periodically recalculate the total power available to each satellite based on power feedback reports from each earth station. As yet a further alternative, the power distribution may be based on the number of user terminals registered in a zone of coverage. The system's overall power may be shifted to optimize or equally load each satellite by reassigning user terminals and/or subbands between satellites and/or earth stations.

The SOC 20 informs each earth station 28 and 29 of the available satellite power which may be used in connection with user terminals assigned to the earth station. For instance, the SOC 20 may inform earth station 28 that it may distribute 500 watts between the beams/subbands of satellite 30 which are assigned to the earth station 28, and 200 watts among the beams/subbands of satellite 31 which are assigned to earth station 28. Thus, earths station 28 may instruct satellite 30 to transmit up to 500 watts of transmission power within the subbands assigned to earth station 28. Similarly, the earth station 28 may instruct satellite 31 to transit up to 200 watts of power in the beams/subbands assigned to earth station 28. In addition, the SOC 20 may inform each earth station of a maximum power limit which may be transmitted by each satellite per subband per beam spot. This power limit is determined by the SOC 20 in order to ensure that the overall system does not exceed the power flux density regulatory requirements as established by the Federal Communications Commission.

Upon receiving the satellite power allocations and regulatory limits from the SOC 20, each earth station thereafter independently controls the power levels of RF signals transmitted by satellites to each user terminal. As explained below, the baseband managers 150 in the earth stations distribute satellite transmission power among the predicted channels without exceeding the subband regulatory power limits and the satellite's available power assigned to the corresponding earth station.

Throughout operation, each earth station provides power demand feedback information to the SOC 20 which is used to update the power allocation among the earth stations. By way of example, the feedback information may include the total power required of the satellite to maintain communications links with minimum signal quality. In this manner, the SOC 20 monitors the actual and required satellite power usage relative to ideal operating power levels. The SOC 20 periodically updates the satellite power allocations to each earth station based on feedback information from the earth stations concerning loads and required satellite transmitter operating power levels.

Optionally, a mobile link test module 24 may be provided for measuring a satellite transmitter operating level. The test module 24 communicates measurements directed to the soc 20. Alternatively, or in addition, a telemetry channel may be maintained between the satellite and each associated earth station. When the telemetry channel is used, the satellite may telemeter transmission operating information to the earth station which in turn relays it to the SOC 20. The SOC 20 in turn utilizes the telemetered satellite operating information while updating the power allocations.

Each earth station estimates its current total satellite power usage relative to the allocated power. Each earth station estimates and controls its satellite power usage per subband per beam relative to the regulatory power limits provided by the SOC 20. Each earth station performs user level power control and dynamic fade margin adjustments for each user (as explained below). Periodically, the earth stations report total satellite power usage, along with power usage per subband per beam for each associated satellite.

Figures 2, 2A:
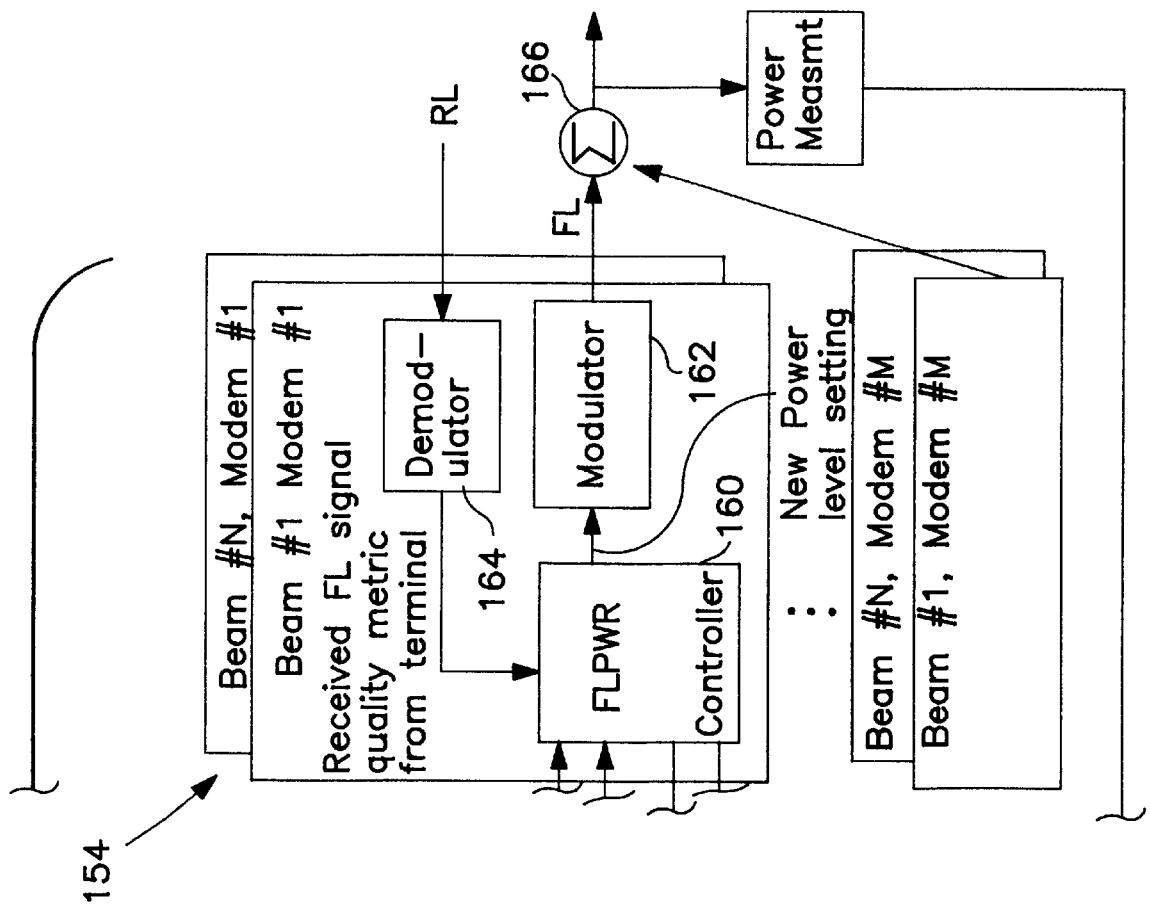
FIG. 2A illustrates a block diagram of an earth station of a preferred embodiment of the present invention.

Turning to FIG. 2A, an earth station 28 is illustrated in more detail. The earth station includes a baseband manager 150, a plurality of beam processors 152, and a plurality of modems 154. Each beam processor operates in connection with an assigned beam emitted by the satellite. Each beam processor includes one or more subband power managers 156 which manage power distribution among the subbands in the associated beam. Each subband power manager 156 communicates with a plurality of modems 154. Each modem 154 operates in connection with a single channel assigned to a particular user terminal. Each subband power manager 156 communicates with all of the modems 154 which support channels in a single corresponding subband. Each modem 154 includes a forward link power controller 160 which controls the power emitted by the satellite within the subband corresponding to the channel assigned to the modem 154. Each modem 154 includes a modulator 162 and a demodulator 164 for modulating and demodulating RF signals transmitted from and received by the earth station in connection with the associated channel. The RF signals emitted by modulators 162 within modems 154 corresponding to a single subband are combined at a summer 166 prior to transmission to form a composite RF signal for the subband. The composite RF signals are transmitted along with a reference tone (explained below).

Figure 3A:
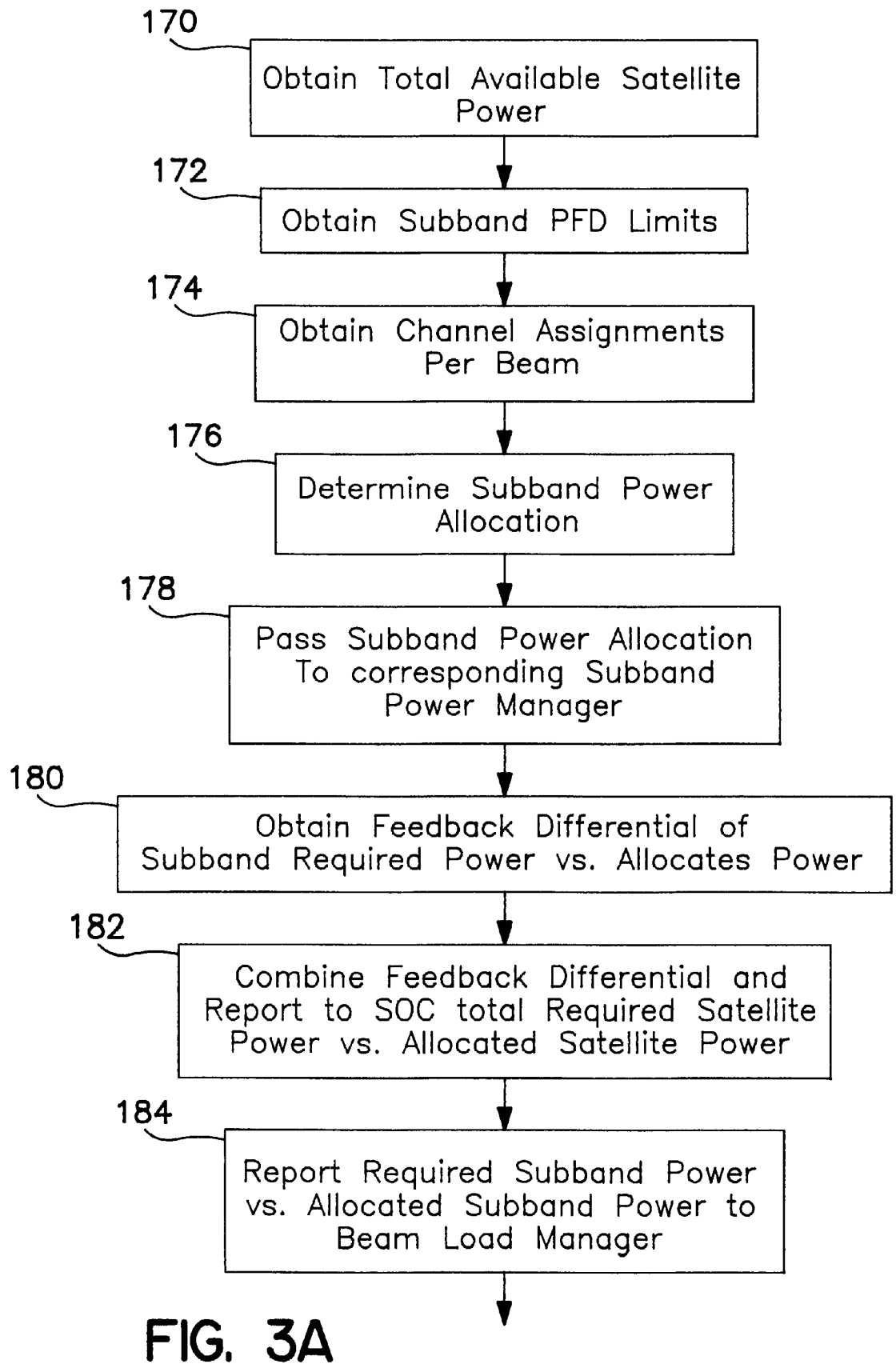
FIGS. 3A–3C illustrate the processing sequence followed by the satellite power manager of the preferred embodiment of the present invention.
Figure 3B:
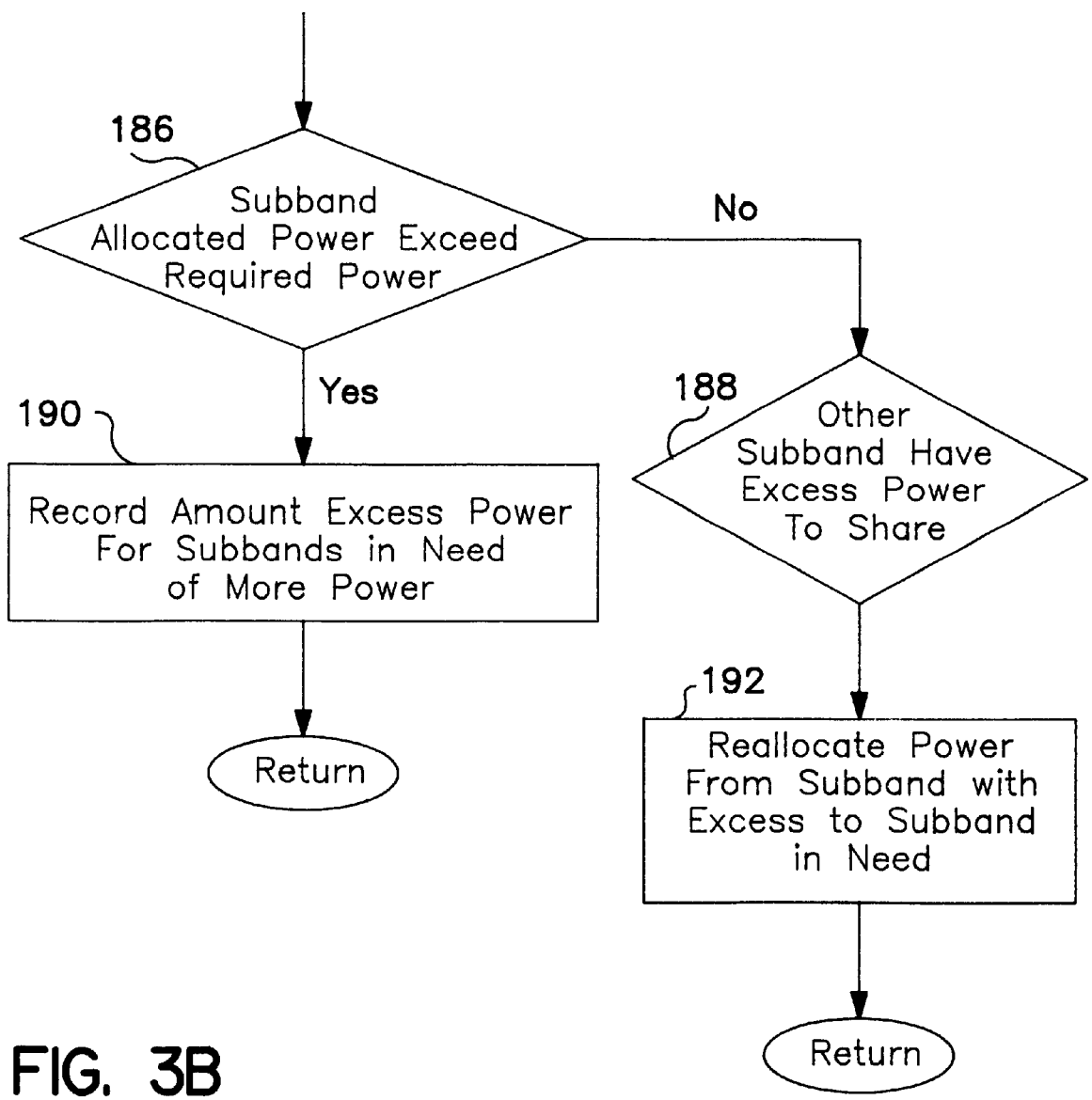
Figure 3C:
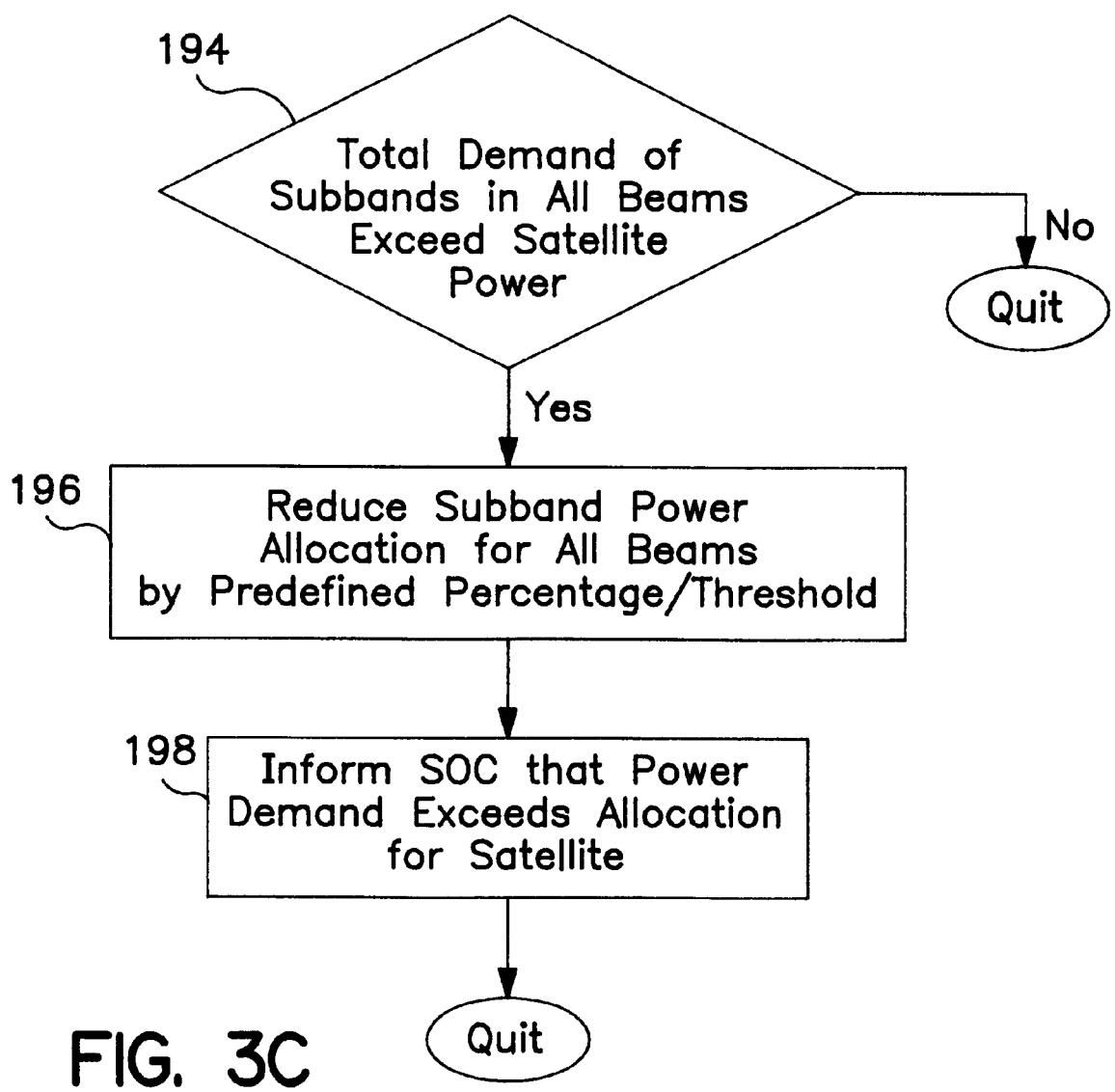

The baseband manager 150 includes a satellite power manager 158 and beam load manager 161 which operates according to the flow process illustrated in FIGS. 3A–3C to control power distribution among beams transmitted by the satellite to user terminals assigned to the earth station.

Figure 2B:
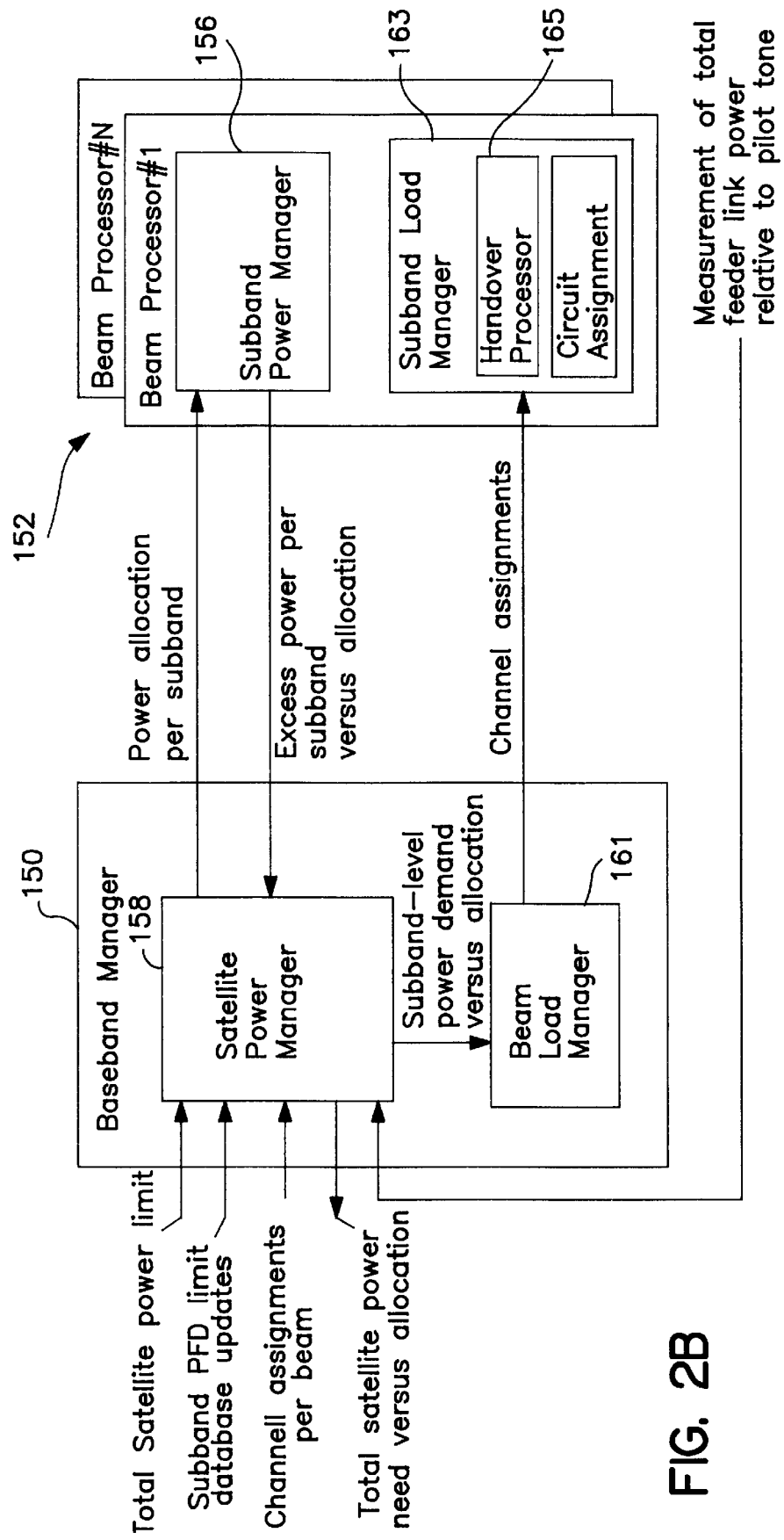
FIG. 2B illustrates a detailed block diagram of the baseband manager and beam processor according to a preferred embodiment of the present invention.

FIG. 2B illustrates the interconnection between the baseband manager 150 and a beam processor 152 in more detail. The satellite power manager 158 receives the total satellite power allocation for the earth station from the SOC. The satellite power manager 158 also receives the number of expected channels to be assigned to the earth station per beam of the associated satellite. The satellite power manager 158 receives, as feedback, the difference between the required and allocated total power per subband for each beam from the beam processor 152. The satellite power manager 158 communicates with the data base 153 which may store PFD limits downloadable from the SOC. The PFD limits may be accessed by geographic region and carrier frequency which are dependent upon the satellite's current position and the beam of interest. Referring to FIG. 3A, the satellite power manager 158 obtains (step 170) the total available satellite power from the SOC 20. At step 172, the satellite power manager 158 obtains the subband PFD limits and at step 174 obtains the channel assignments per beam (from the SOC 20 or a database). At step 176, the satellite power manager determines the power to be allocated to each subband.

This determination may be based on the number of potential user terminals expected to request channels within a particular subband. Alternatively, this determination may be based on the position within the satellites field of view of the beam containing the present subband. As a further alternative, the subband power allocations may be based on data concerning past usage demands. By way of example, user terminals may register according to one of several processes set forth in co-pending applications entitled "Satellite Based Cellular Telecommunications System Utilizing A Multiple Registration Location Register" and entitled "Earth Stationed Subsystem" filed on or about May 1, 1996 and assigned to the assignee of the present invention. The two above noted co-pending application are incorporated herein by reference in their entirety. At step 178, the subband power allocations are passed to corresponding subband power managers 158.

At step 180, the satellite power manager 158 obtains the feedback differential between the subband required power and the subband allocated power from the Subband Power Manager 156. At step 182, the satellite power manager 158 combines the feedback differentials for all of the subbands of the current satellite and reports, to the SOC, the total required power and the total allocated satellite power. Next, the satellite power manager 158 reports to the beam load manager 161 (FIG. 2B) the required subband power and the allocated subband power. Next it determines that step 186 (FIG. 3B) whether the allocated subband power exceeds the required subband power. If so, control passes to step 190 at which the satellite power manager 158 records the amount of excess subband power for future use by other subbands which may need additional power. Returning to step 186, if the allocated subband power does not exceed the required power, then the subband needs additional power. Hence, flow passes to step 188 at which the satellite power manager 158 determines whether other subbands have recorded excess power which may be reallocated to the present subband in need of additional power. At step 192, if such additional power exists, the satellite power manager 158 reallocates the power from the subband in excess to the subband in need and passes new power allocations per subband to the subband power manager 156. Excess power represents the power allotted to a subband, but not needed to achieve the desired quality of service for the user terminals currently in use. The excess power report also indicates when the user terminals demand more power from a particular beam than has been allocated thereto by the satellite power manager 158. The satellite power manager 158 uses the excess power report to reallocate power between beams, such as when one beam requires more power than has been allocated thereto, while an adjacent beam does not require all of its allotted power.

When the excess power reports for all of the beams assigned to the earth station indicate that additional power remains, optionally, the satellite power manager 158 may distribute the excess additional power among the subbands. The distribution of additional power may be even or uneven according to some other desired function. Once the manager 158 allocates all of the available power to the beam spots, the baseband manager 150 reports back to the Soc 20 the difference between the necessary minimum total satellite power and the allotted power. Thus, if the beams assigned to the earth station 28 only require 80% of the total power allocated by the SOC 20, the baseband manager 150 returns this information to the SOC 20. Optionally, the SOC 20 may shift the unneeded 20% to beams upon the satellite which have been assigned to a different earth station by outputting new satellite power allocation amounts.

According to the foregoing process, the baseband manager 150 continuously updates the subband power allocations for each beam based on the total satellite power allocation, the PFD limits and the usage recorded from each beam processor 152.

Figure 4:
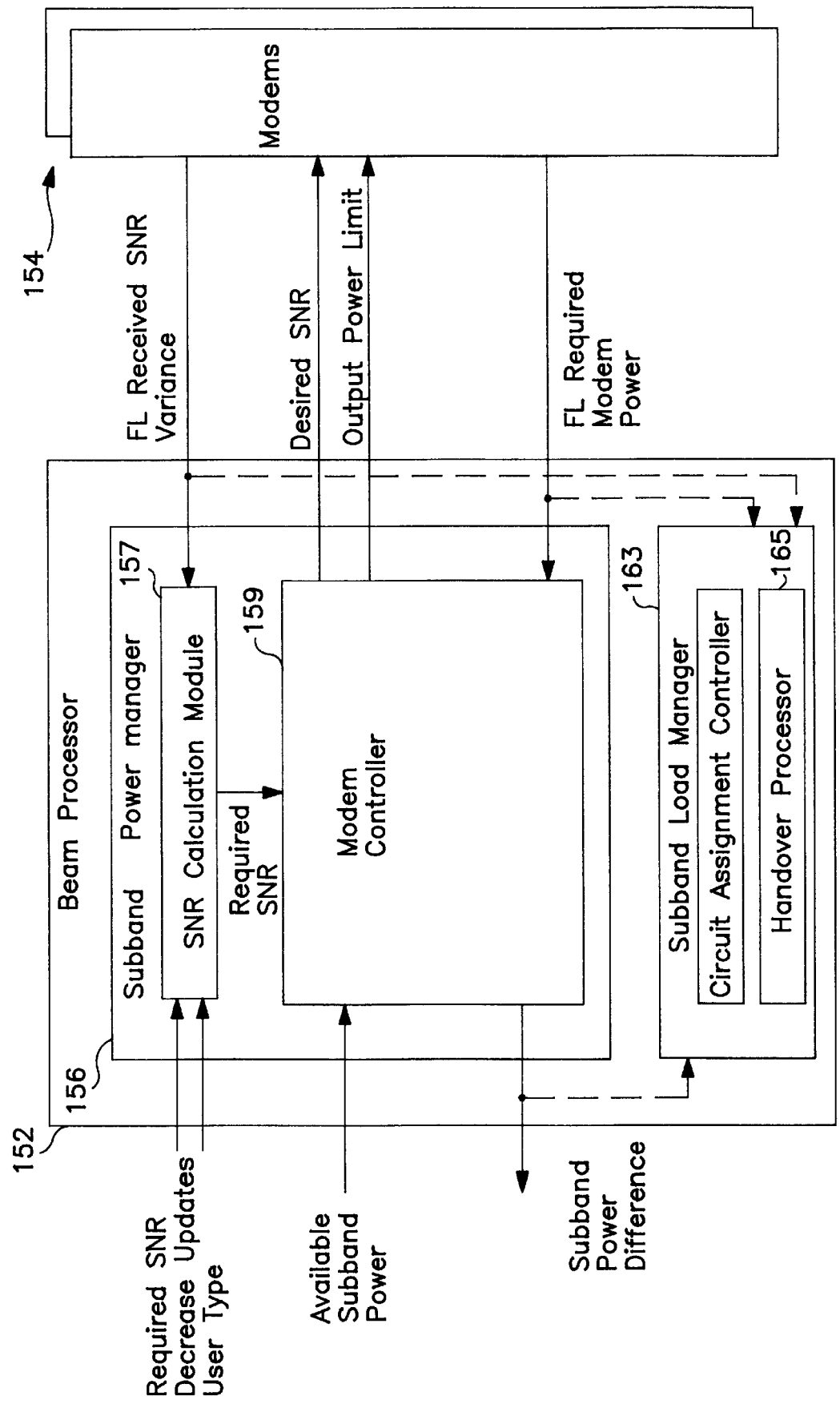
FIG. 4 illustrates a more detailed block diagram of the beam processor of the preferred embodiment of the present invention.

Turning to FIG. 4, a beam processor 152 is illustrated in more detail. The beam processor 152 includes a subband power manager 156 which includes a signal-to-noise (SNR) ratio calculation module 157. The SNR calculation module 157 accesses a data base 155 (FIG. 2) to obtain a required SNR value for the current user terminal based on the user terminal's type. The user terminal's type may be provided by the baseband manager 150, or may be stored in data base 155. The SNR value obtained from data base 155 represents a minimum required SNR value necessary to achieve a quality of service desired by the user terminal. The SNR calculation module 157 further receives the forward link SNR variance from the modem assigned to the current user terminal. The SNR calculation module 157 also obtains a "fade margin" for the current channel associated with the current user terminal. The "fade margin" represents a predetermined bias value added to the minimum required SNR value for a user terminal in order to compensate for rapid fluctuations in the received power level at the user terminal. These fluctuations are sufficiently rapid that they are difficult to correct by the system through its normal power control loop. Thus, a bias or "fade margin" is added to the minimum SNR value to ensure that, during a minimum of a rapid fluctuation, the power level never falls below the lowest acceptable value. The beam processor may determine the fade margin for each user terminal based on the subband power allocation received from the satellite power manager 158, the user terminal type and position within an associated beam spot. The fade margin may also be determined based on forward SNR feedback statistics reported from a modem 154 corresponding to the current user terminal. The fade margin may also be based on the current power usage of the modem. The SNR calculation module 157 combines the required SNR value, SNR variance and fade margin to generate a new required SNR value for the forward link (FL) with the current user terminal. This required FL SNR value is supplied to the modem control module 159.

Figure 5A:
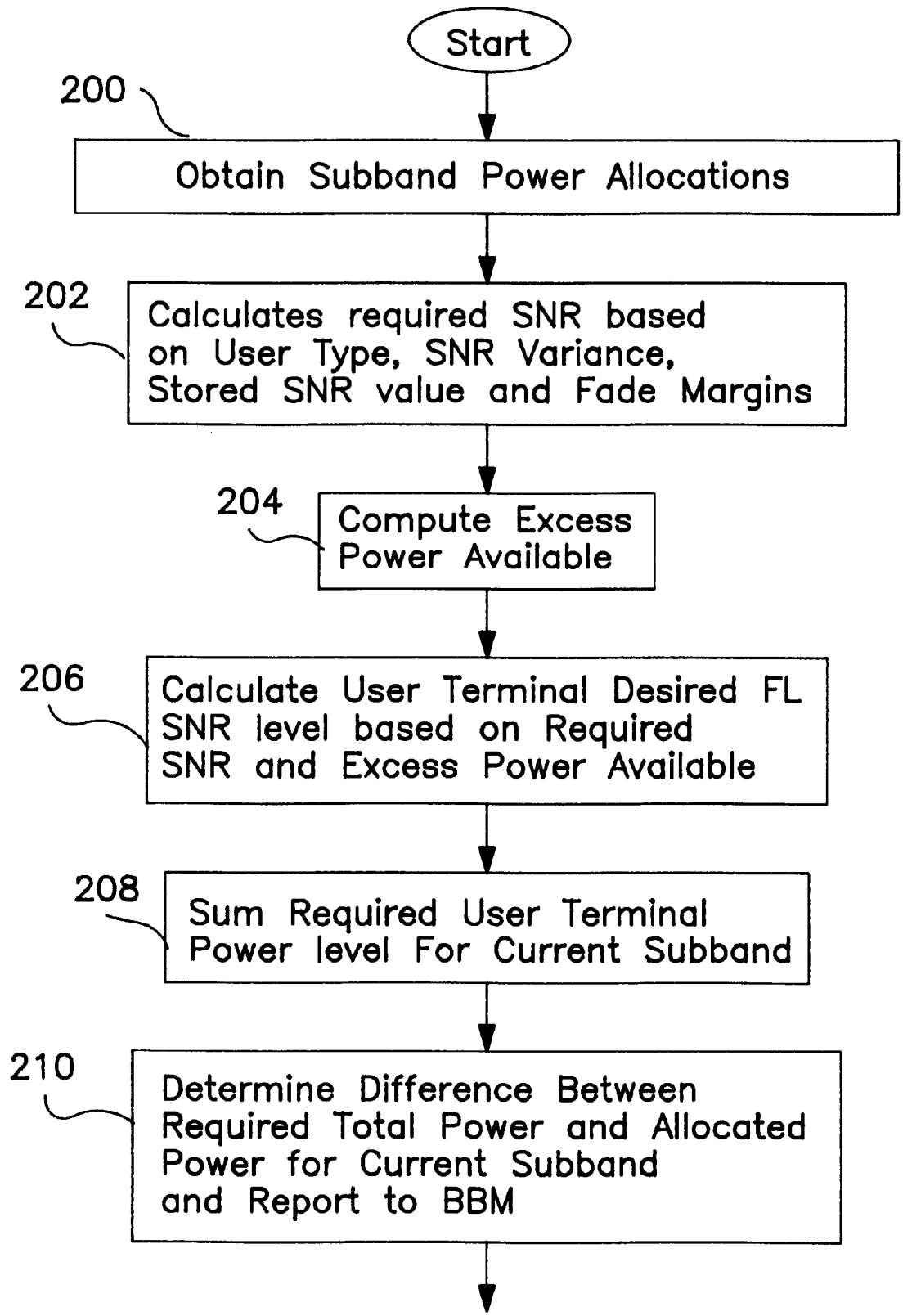
FIGS. 5A and 5B illustrate the processing sequence carried out by the beam processor of FIG. 4 according to the preferred embodiment of the present invention.
Figure 5B:
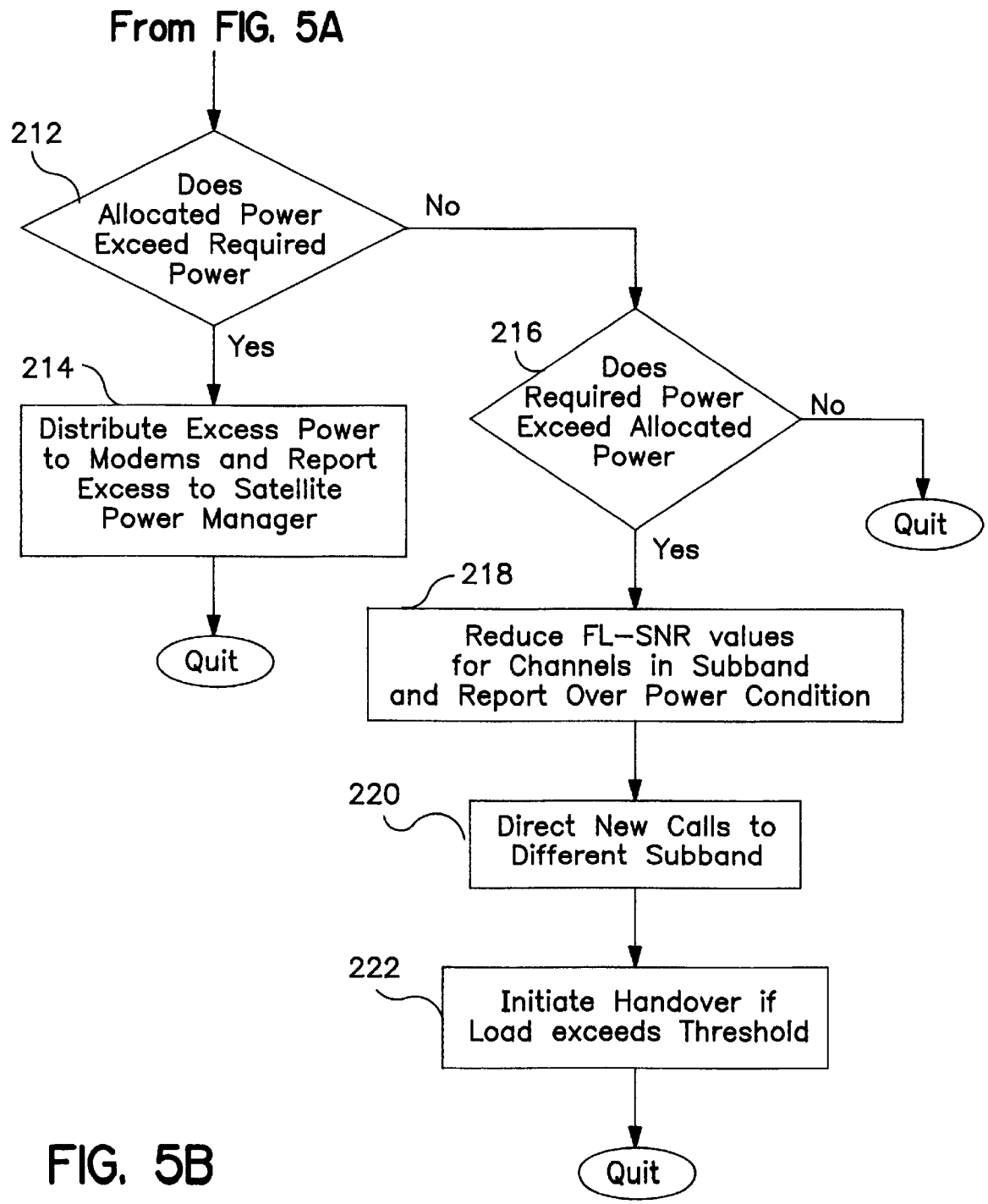

FIGS. 5A and 5B illustrate the processing sequence carried out by the subband power manager 156. Initially, modem controller 159 obtains the subband power allocation from the satellite power manager 158 for the current subband (step 200). At step 202, the SNR calculation module 157 calculates the required SNR value as described above. The modem controller 159 outputs the desired SNR value to the modem 154 corresponding to the current channel within the current subband. The modem controller 159 also outputs the power limit which may not be exceeded by the modem. The modem 154 drives the satellite to emit sufficient power in the forward link to establish the desired SNR value at the user terminal. The modem thereafter returns the power level required of the satellite to achieve the desired SNR value. The modem controller 159 receives feedback information from all of the modems corresponding to the current subband and determines the total required power of the current subband to achieve the desired SNR values for each channel within the current subband. The modem controller 159 then determines whether the allocated power for the current subband exceeds or is less than the total power required to achieve the desired SNR values for each active channel within the subband. The modem controller 159 distributes this excess power by determining a desired forward link (FL) SNR value for each user terminal. The desired FL-SNR value represents the SNR level to be maintained by each modem for the forward link of the associated channel. The modem controller 159 calculates the desired SNR level for the current modem based on the associated user terminal's desired FL-SNR value and the excess power available (step 206 in FIG. 5A). The modem controller 159 outputs the desired FL-SNR value and outputs the maximum power level to which the modem may drive the satellite transmitter for the associated channel.

As explained below, each modem 154 continuously adjusts the output power of its associated channel to maintain the desired received SNR value in the presence of beam spot motion and user motion. Thereafter, the modem returns, to the modem controller 159, the forward link satellite output power level emitted in the current channel by the satellite. At step 208, the modem controller 159 combines FL required modem power levels returned from each modem for a subband to determine the total subband power. The modem controller 159 obtains a difference between the required FL subband power and the available FL subband power allotted by the baseband manager and returns a difference power level to the satellite power manager 158 (step 210). The subband power difference represents the difference between the available subband power, as provided by the baseband manager, and the required subband power, as determined by the feedback, from the modems for the current subband.

Turning to FIG. 5B, once the subband power difference is calculated at step 210, flow passes to step 212 at which the controller 157 determines whether the allocated subband power exceeds the required subband power. If so, the excess power is distributed among the modems in a desired manner (step 214). In addition, this excess is reported back to the satellite power manager 158. As explained above, the satellite power manager 158 may decide to take away the excess power from the current subband and allocate it to another subband and/or beam (see FIGS. 3A and 3B). If the decision in step 212 is negative, the flow passes to step 216 at which it is determined whether the required subband power exceeds the allocated subband power. If so, the modem controller 159 reduces the desired FL-SNR values for the user terminals within the current subband in order that the output power level associated with the desired FL-SNR values does not exceed the allocated power level.

Optionally, the desired FL-SNR value for each user terminal may be reduced unevenly across the subband such as to maintain the desired FL-SNR value of each user terminal by a proportional amount above the minimum required FL-SNR value for each user terminal. This overpowered condition is reported at step 218 to the satellite power manager 158 which will subsequently, if possible, allocate additional power to the subband in an overpowered state (as explained above in connection with FIGS. 3A and 3B). In addition, at step 220, the subband load manager 163 may be instructed to direct new calls to and from user terminals in the same beam to another subband other than the current subband which is operating in an overloaded power state. Thus, the subband load manager 163 distributes new calls among the subbands in order to avoid overloading of a single subband. The subband load manager 163 may operate independently in response to the feedback reported from the subband power manager 156 or alternatively under the direct control of the beam load manager 161 in the baseband manager 150.

At step 192 (FIG. 3B), the beam load manager 161 may determine which subbands within the current beam use the least power to direct the subband load manager 163 to redirect new calls accordingly. The beam load manager 161 then assigns a new channel to this underpowered subband and relays the channel assignment to the subband load manager 163. The subband load manager 163 then uses this assignment information to establish a new channel with the new user terminal.

Optionally, at step 222, a handover processor 165 within the subband load manager 163 may be activated to handover one or more active channels from the current subband to a different subband within the same beam spot. By handing over channels between subbands in this matter, the handover processor 165 shifts load between subbands. The handover processor 165 may be controlled by the subband power manager 156 and/or by the beam load manager 161. If controlled by the subband power manager 156, the handover processor 165 receives its instructions to effect a handover at step 222 (FIG. 5B). If the handover processor 165 is controlled by the beam load manager 161, the handover instructions will be transmitted at step 192 (FIG. 3B) as part of the subband power reallocation process carried out by the baseband manager 150.

According to the above process, each beam processor 152 receives, from the satellite power manager 158, the total power allocated for each subband within the associated beam. The beam processor 152 receives, from each modem 154, the current power output level for each forward link to an active user terminal, along with the variance within the forward link's signal-to-noise ratio. The signal-to-noise ratio variance represents the statistical difference in the SNR value received at the user terminal and the desired SNR value assigned to the modem 154. The beam processor 152 may receive from each modem 154 the type of user terminal being serviced by the modem 154 in an active communications link.

The beam processor 152 outputs a desired FL-SNR value to be received at the user terminal, along with a maximum satellite power output in connection with each modem 154. The beam processor 152 returns to the satellite power manager 158 a difference between the available subband power and the required subband power for each subband within the beam associated with the current beam processor. The beam processor 152 may access a data base 155 to obtain required FL-SNR values for each type of user terminal and any other desired SNR statistics, such as high variance, low variance, etc. The data base of SNR values is downloadable from the baseband manager each time the beam processor is assigned to a new beam. Thus, the content of the data base 155 may be a function of the current beam's position within the satellite's field of view.

FIG. 3C illustrates the processing sequence followed by the satellite power manager 158 when it determines that the total demand of all subbands in all beams assigned to the present baseband manager (earth station) exceed the satellite power allocation for these beams (step 194). At step 196, the satellite power manager 158 reduces the subband power allocations for all beams associated with the current earth station. This reduction may be performed according to a predefined fixed threshold value for each subband. Alternatively, this power reduction may be performed according to a predefined or calculated percentage of the total power allocated to each subband in order to reduce the subbands more evenly. At step 198, the satellite power manager 158 informs the SOC that the power demand has exceeded the allocated power for the beams corresponding to the current earth station. As explained above, the SOC may redistribute power allocation between earth stations to more evenly load the satellites and beams therein. Optionally, the SOC may also reassign user terminals and/or subbands and/or beams between overlapping satellites to shift load from the satellite operating in an overloaded position to a satellite operating in an underloaded state.

Next, the discussion turns to the power control loops used in connection with the forward link FL (FIG. 6) and the return link RL (FIG. 7) of a channel to ensure a desired signal quality at the user terminal 10 and at the earth station 20, respectively.

Figure 6:
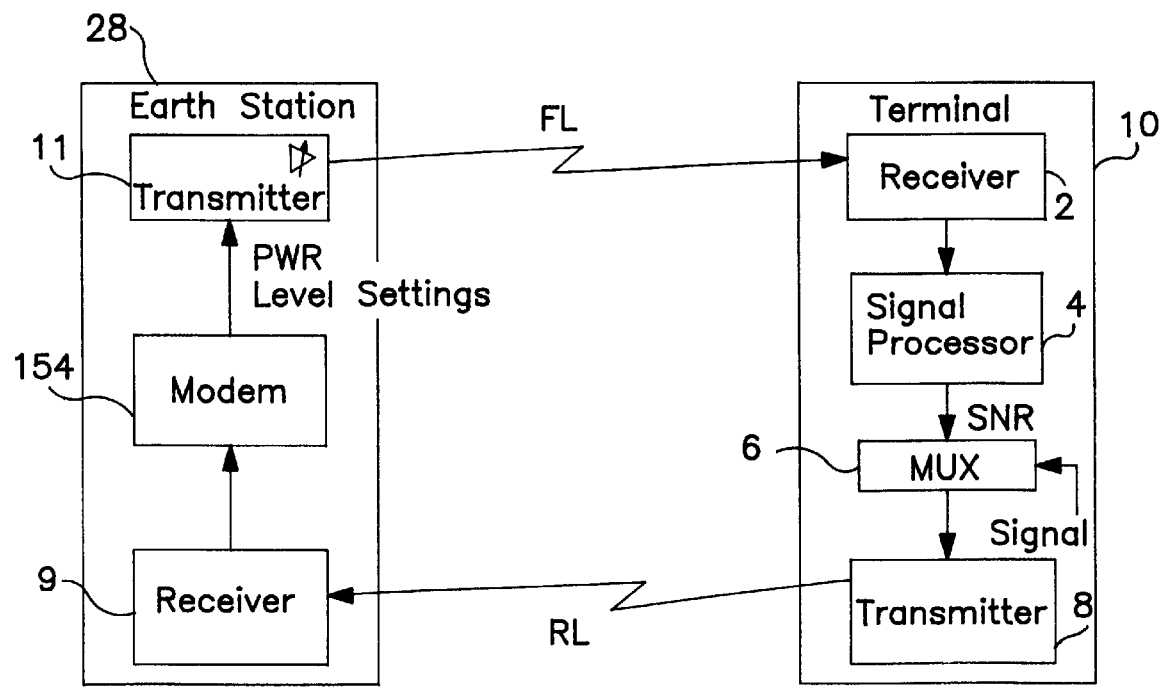
FIG. 6 illustrates a forward link power control loop between an earth station and a user terminal according to the preferred embodiment of the present invention.

Beginning with FIG. 6, an earth station 28 and a user terminal 10 are illustrated. While the intermediate satellite has not been illustrated, it is understood that the communications links between the earth station and user terminal 28 and 10 pass through an associated coverage satellite. The earth station 28 includes a transmitter 11 which transmits RF signals along a forward link FL to a receiver 2 at the user terminal 10. The receiver 2 passes the incoming RF signal to a signal processor 4 which determines the received signal quality (e.g., SNR). The signal processor 4 outputs a signal-to-noise ratio (SNR) value corresponding to the received RF signal. The SNR value is combined in a multiplexor 6 with an outgoing traffic signal which is passed to the transmitter 8 and transmitted to the earth station 28 via an RF return link RL. A receiver 9 at the earth station 28 receives the RF signal upon the return link RL. The RF signal is passed to a modem 154 which demodulates the RF signals and demultiplexes the SNR value from the traffic information. The modem 154 compares the received SNR value with the desired SNR value (delivered from the corresponding beam processor 152). Based on this comparison, the modem 154 increases or decreases a power level supplied to the transmitter 11. As explained below the power level setting instructs the satellite to increase or decrease the output transmission power of subsequent RF signals along the associated forward link.

The power level control loop of FIG. 6 is repeated continuously throughout communication between an earth station and each active user terminal in order to maintain the output power of the satellite at a level sufficient to ensure that the received SNR value at the user terminal 10 substantially corresponds to the desired SNR value determined in the earth station 28. Optionally, the signal processor 4 may be modified to calculate the received SNR value based on several incoming RF signals in order to obtain an average of these multiple received SNR values. By averaging the received SNR values for multiple incoming samples, the processor 4 avoids unnecessary drastic short term variations in the output power level.

Figure 7:
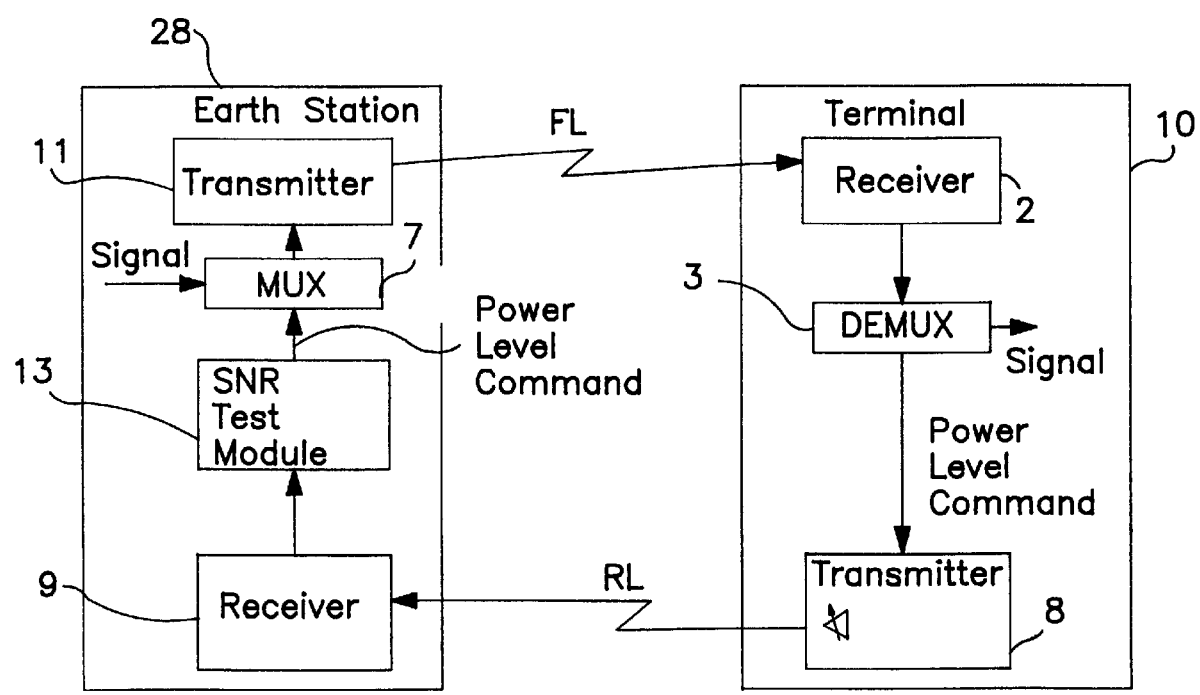
FIG. 7 illustrates a return link power control loop according to a preferred embodiment of the present invention.

With reference to FIG. 7, the power level control loop is now described in connection with the return link RL to ensure that the receiver 9 in the earth station 28 receives the desired signal quality. Beginning at user terminal 10, an RF signal is output by transmitter 8 along the return link RL which is received at receiver 9. An SNR test module 13 tests the signal-to-noise ratio of the incoming RF signal at receiver 9. The received SNR value is compared with the desired SNR value, and the difference therebetween is used to determine a new power setting command to be passed to the user terminal 10. The new power setting command identifies the power level at which the transmitter 8 must emit RF signals along return link RL to ensure that the satellite receives such RF signals with sufficient quality. The power setting commands are combined with an outgoing traffic signal within a multiplexor 7 and passed to the transmitter 11. The transmitter outputs the RF signal containing the power setting commands along the forward link FL to the terminal 10. A demultiplexor 3 separates the power level commands from the traffic signal and passes the power level commands to the transmitter 8. The transmitter 8 updates its output power based on the received level command. According to the foregoing loop, the return link power is maintained at a desired level.

Figure 8:
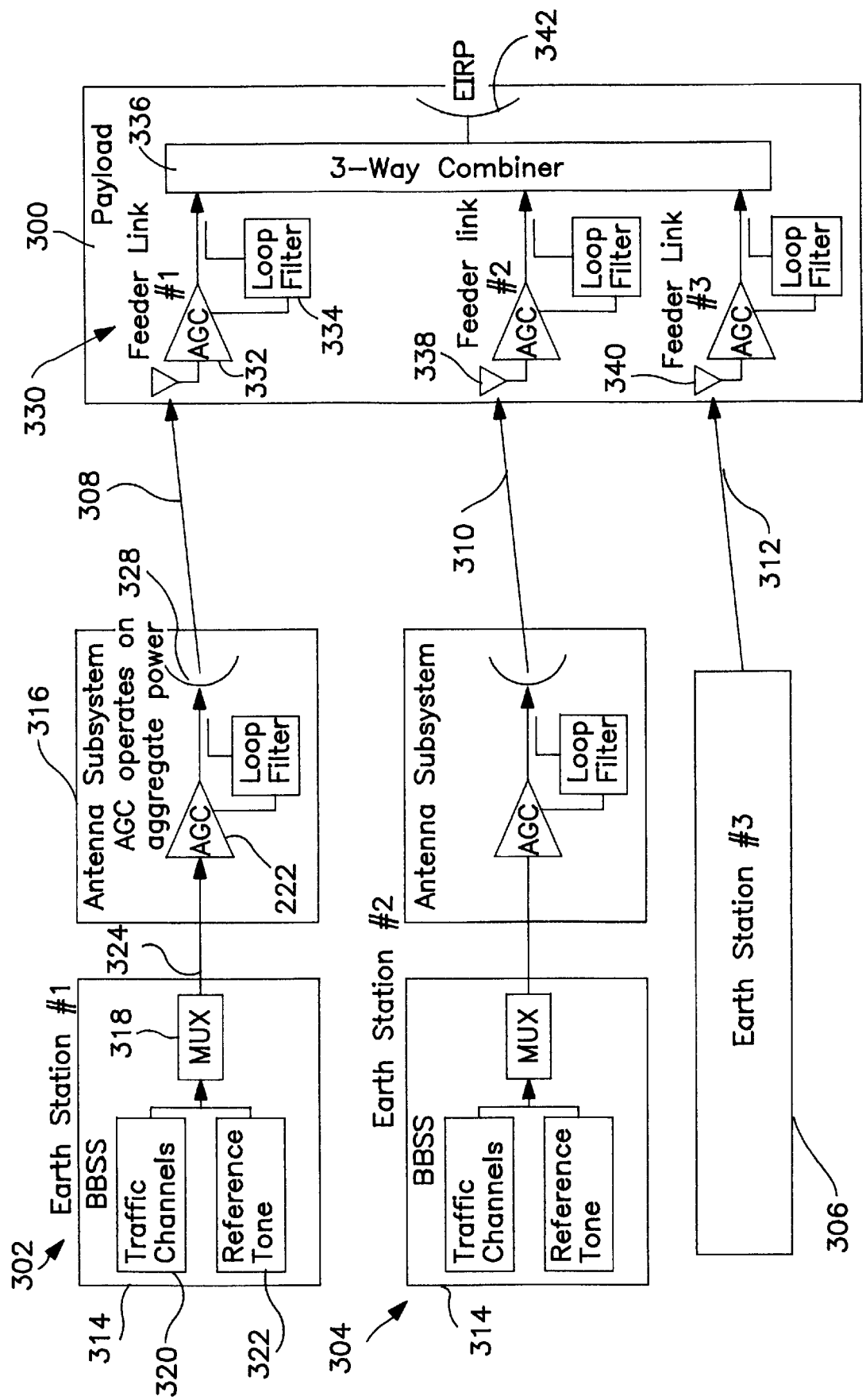
FIG. 8 illustrates an automatic level controller carried out according to the preferred embodiment of the present invention.

With reference to FIG. 8, next the discussion turns to the process used to automatically control the power output levels of the satellite transmitter in forward links to all of the associated user terminals. FIG. 8 illustrates a satellite 300 which receives RF signals transmitted by earth stations 302–306 along forward feeder links 308–312. Each earth station 302–306 includes a baseband subsystem 314 which communicates with an antenna subsystem 316. The baseband subsystem 314 includes a multiplexor 318 which receives RF signals containing communications data, command information and the like along traffic channels 320 for all of the user terminals assigned to the earth station 302. The multiplexor 318 combines the RF signals along traffic channels 320 with a reference tone produced by tone generator 322. The communications signals and reference tone are passed along line 324 to the antenna subsystem through an automatic gain controller 326.

The automatic gain controller 326 is controlled to adjust the aggregate output power transmitted by antenna 328 along the feeder link 308. The RF signal transmitted along forward link 308 is received at a feeder link 330 and passed to an automatic gain controller 332. The gain of the automatic gain controller (AGC) 332 is adjusted to force the level of the reference tone embedded in the RF signal to achieve a desired level of the AGC output. By adjusting the gain at AGC 332, the reference tones from each of the multiple feeder links are driven to the same power levels while maintains the relationships between individual user power and the reference tone. In this way, any differences in propagation loss between the multiple feeder links have been compensated prior to combining the RF signals. The 3-way combiner 336 combines the RF signals received at feeder links 330, 338 and 340, respectively, and outputs same from the antenna 342 which defines the coverage region of the satellite. Next, an example is illustrated in connection with FIGS. 9A and 9B to explain the manner in which the preferred embodiment achieves automatic level control.

Figure 9A:
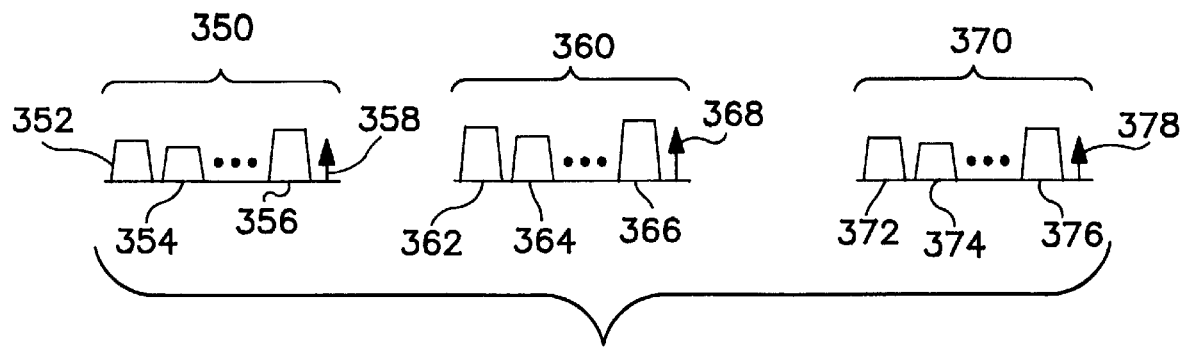
FIGS. 9A and 9B illustrate exemplary RF signals transmitted in connection with the power level controller of FIG. 8 according to the preferred embodiment of the present invention.

FIG. 9A illustrates an exemplary RF signal 350 produced by the multiplexor 318. The RF signal 350 includes communications data for multiple subbands 352, 354 and 356. The composite signal 350 also includes a tone 358 produced by tone generator 322. The reference tone 358 has an amplitude corresponding to a predefined power output level. For instance, the tone 358 may correspond to two watts of transmission power ultimately transmitted by the satellite 300. The composite RF signal 350 is passed through the antenna subsystem 316 and transmitted from antenna 328.

During transmission, the RF signal may pass through interference, such as clouds, rain and the like. Such interference may alter the magnitudes of the signals within each subband 352–356 and the magnitude of the reference tone 358. The received composite signal 360 in FIG. 9A is representative of the signal received at feeder link 330. The received composite signal 360 includes subband signals 352–356 and a reference tone 358. The magnitudes of the subband signals and reference tone have increased, although, the relative amplitudes between the subband signals 352–356 and the reference tone 358 have not changed. The filter 334 adjusts the gain of the AGC 332 until it outputs the received reference tone 368 at an amplitude corresponding to the predefined amplitude associated with the predetermined output power level (e.g., two watts). Thereafter, the AGC 332 is controlled to output the adjusted composite RF signal 370 (FIG. 9A). As adjusted by the AGC 332, the RF signal 370 includes a referenced tone 378 equal in magnitude to the original reference tone 358 output by the multiplexor 318. In addition, the amplitudes of the RF signals in subbands 372–376 equal the amplitudes of the original subband signals 352–356.

Accordingly, by combining reference tones preassigned to a corresponding transmission power level, the earth station is able to ensure that the satellite receives over the feeder link a composite RF signal having a desired relation between the tone and traffic signals transmitted from the earth station. The subsequent signal transmitted from antenna 342 corresponds in amplitude to the amplitudes established by the relation between subband signals 372–376 and reference tone 378. Accordingly, by adjusting the amplitude of the subband signals 352–356 at the modems relative to the reference tone 358, the earth station is able to control the transmission power generated within each subband at the antenna 342.

Figure 9B:
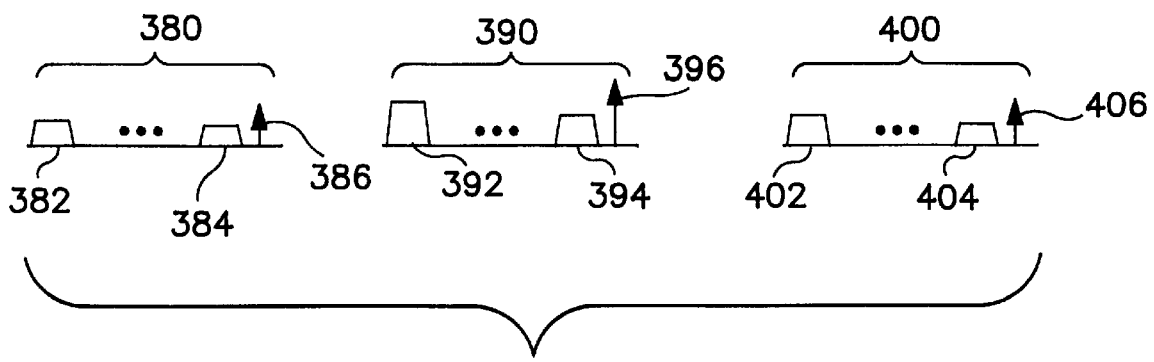

FIG. 9B further illustrates a second example of the automatic level control process according to the preferred embodiment of the present invention. FIG. 9B illustrates an original composite RF signal 380, a received composite RF signal 390, and an adjusted composite RF signal 400. The original and adjusted composite signals 380 and 400 include subband signals 382–384 and 402–404, which are equal in amplitude. Reference tones 386 and 406 are also equal in amplitude. This amplitude relationship is maintained even though the received composite RF signal 390 included subband signals and a reference tone 392, 394 and 396 which substantially differed in amplitude from the original intended signal.

The adjusted composite RF signals 270 and 300 are combined in the 3-way combiner 236 and transmitted along corresponding subbands to the intended terminals.

According to the above described preferred embodiment of the present invention, the SOC 20 allocates total satellite power and delivers same to each earth station. Within the earth station, the baseband manager subdivides the satellites total allocated power between beams and subbands. The beam processors, upon receiving the subband power allocations, control sets of modems associated with each subband to achieve required forward link SNR values. The modems adjust the output power of RF signals transmitted from the antenna subsystem to the satellite via the feeder link. The modems maintain a desired relation between subband power levels and a reference tone within each transmitted RF signal. The satellite adjusts the AGC associated with each feeder link based on the reference tone within each received RF signal to properly adjust the gain of the incoming RF signal. The satellite then combines the adjusted RF signals from the multiple feeder links in a combiner and transmits a composite RF signal from the antenna throughout the satellites field of coverage with corresponding subbands of predefined power within each beam spot. The modems receive feedback with respect to the signal quality and adjust the satellites output power by adjusting the amplitudes of the RF signals within the composite RF signal 350. The beam processors, baseband manager and SOC adjust the power allocated to each beam based on feedback from the modems.

Optionally, a test module 24 may be provided proximate the earth station to receive a test RF signal transmitted from the satellite 30. The test module 24 measures the total feeder link power relative to the reference tone based on a return signal from the satellite 30.

Optionally, the baseband manager and beam processor may cooperate to redistribute power initially reserved for future predicted channels to active channels which require additional power to achieve the minimum acceptable SNR value. For instance, if a particular subband is predicted to include 20 channels, the baseband manager and beam processor will reserve sufficient power to service 20 channels if they become active. However, during processing if 5 channels are active and the remaining are inactive, the beam processor and baseband manager may reallocate a percentage of the reserved power to other beams and/or subbands which are in need of additional power. The baseband manager and beam processor will initially divide the available power to support a predetermined minimum number of additional active channels from the 20 predicted channels.

While particular elements, embodiments and applications of the present invention have been shown and described, it will be understood, of course, that the invention is not limited thereto since modifications may be made by those skilled in the art, particularly in light of the foregoing teachings. It is, therefore, contemplated by the appended claims to cover such modifications as incorporate those features which come within the spirit and scope of the invention.

We claim:

1. A power control subsystem in a satellite based telecommunications system for distributing satellite transmission power among a plurality of communications channels between at least one earth station and at least one user terminal through a satellite, said subsystem comprising:

an operating center for assigning a total satellite available power for use by a satellite with at least one communications channel, said channel being in a predetermined subband in a predetermined beam emitted by the satellite; and an earth station for controlling distribution of said total available power among communications channels in subbands of beams emitted by the satellite, said earth station including a baseband manager for dividing said total available power between subbands to provide subband power allocations, said earth station including a beam processor for determining a desired signal quality to be maintained by the satellite along said communications channels, said beam processor adjusting said desired signal quality based on said subband power allocations.

2. A subsystem according to claim 1, wherein said earth station further includes a plurality of modems assigned to a corresponding number of communications channels, said modems adjusting a satellite transmission power level, at which the satellite emits RF signals along forward links of said communications channels, to maintain said desired signal quality determined by said beam processor.

3. A subsystem according to claim 1, wherein said baseband manager determines subband power allocations for each beam based on total satellite power allocation, PFD limits and required power levels reported from said beam processor.

4. A subsystem according to claim 1, wherein said beam processor determines fade margins for each user terminal within a beam based on subband power allocations.

5. A subsystem according to claim 1, wherein said beam processor determines fade margins based on user terminal type and user terminal position within a field of view of a satellite.

6. A subsystem according to claim 1, wherein said beam processor determines fade margins based on signal-to-noise ratio information reported to said beam processor from a modem corresponding to a current user terminal.

7. A subsystem according to claim 1, wherein said baseband manager reallocates power between first and second subbands to shift power to said first subband which requires additional power and to shift power from said second subband which includes excess power.

8. A subsystem according to claim 1, wherein said beam processor decreases a desired signal-to-noise ratio for a corresponding subband when a corresponding modem indicates that sufficient power has not been allocated to said subband to achieve said desired signal-to-nose ratio.

9. A subsystem according to claim 1, wherein said beam processor reports a subband power demand for each subband to the baseband manager.

10. A subsystem according to claim 1, wherein said operations center divides a total power capacity of a common satellite between earth stations using beams of the common satellite.

11. A subsystem according to claim 1, wherein said operations center provides to said earth station power limits per subband per beam.

12. A subsystem according to claim 1, wherein said operations center reallocates a total power capacity of a common satellite between earth stations using beams of the common satellite based on feedback power requirement information from said earth stations.

* * * * *

UNITED STATES PATENT AND TRADEMARK OFFICE
CERTIFICATE OF CORRECTION

PATENT NO. : 5,924,015
DATED : July 13, 1999
INVENTOR(S) : Arthur L. Garrison et al.

It is certified that error appears in the above-identified patent and that said Letters Patent is hereby corrected as shown below:

On title page, item 73, Assignee
Add - TRW Inc., Redondo Beach, Calif.

Signed and Sealed this

Twenty-eighth Day of November, 2000

Attest:

Attesting Officer

Q. TODD DICKINSON
Director of Patents and Trademarks